(12) United States Patent
Barnes

(10) Patent No.: US 11,023,237 B2
(45) Date of Patent: Jun. 1, 2021

(54) APPARATUS AND METHOD FOR INTERPRETING PERMISSIONS ASSOCIATED WITH A CAPABILITY

(71) Applicant: ARM LIMITED, Cambridge (GB)

(72) Inventor: Graeme Peter Barnes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/607,461

(22) PCT Filed: Apr. 27, 2018

(86) PCT No.: PCT/GB2018/051117
§ 371 (c)(1),
(2) Date: Oct. 23, 2019

(87) PCT Pub. No.: WO2018/215734
PCT Pub. Date: Nov. 29, 2018

(65) Prior Publication Data
US 2020/0142700 A1 May 7, 2020

(30) Foreign Application Priority Data
May 25, 2017 (GB) ..................................... 1708393

(51) Int. Cl.
*G06F 9/30* (2018.01)
*G06F 9/355* (2018.01)
(Continued)

(52) U.S. Cl.
CPC ...... *G06F 9/30181* (2013.01); *G06F 9/30101* (2013.01); *G06F 9/30145* (2013.01);
(Continued)

(58) Field of Classification Search
CPC ............. G06F 9/30181; G06F 9/30101; G06F 9/30145; G06F 9/30189; G06F 9/3557;
(Continued)

(56) References Cited

U.S. PATENT DOCUMENTS

| 6,826,672 B1 * | 11/2004 | Brown | G06F 12/1475 |
| | | | 711/220 |
| 2003/0135789 A1 * | 7/2003 | DeWitt, Jr. | G06F 11/3636 |
| | | | 714/38.13 |

(Continued)

FOREIGN PATENT DOCUMENTS

| EP | 2 587 376 | 5/2013 |
| EP | 2 603 872 | 6/2013 |

(Continued)

OTHER PUBLICATIONS

Combined Search and Examination Report for GB Application No. 1708393.2 dated Oct. 31, 2017, 6 pages.

(Continued)

*Primary Examiner* — Farley Abad
(74) *Attorney, Agent, or Firm* — Nixon & Vanderhye P.C.

(57) ABSTRACT

An apparatus and method are provided for interpreting permissions associated with a capability. The apparatus has processing circuitry for executing instructions in order to perform operations, and a capability storage element accessible to the processing circuitry and arranged to store a capability used to constrain at least one operation performed by the processing circuitry when executing the instructions. The capability identifies a plurality N of default permissions whose state, in accordance with a default interpretation, is determined from N permission flags provided in the capability. In accordance with the default interpretation, each permission flag is associated with one of the default permissions. The processing circuitry is then arranged to analyse the capability in accordance with an alternative inter- (Continued)

ALTERNATIVE INTERPRETATION (ASSUMING ONE W BIT AND ONE R BIT FOR EASE OF ILLUSTRATION)

```
XRW
0 0 0 - non-executable, no access, modifiable
0 0 1 - non-executable, write only, modifiable
0 1 0 - non-executable, read only, modifiable
0 1 1 - non-executable, read/write, modifiable
1 0 0 - executable, no-access, non-modifiable
1 0 1 - non-executable, writeable, modifiable
1 1 0 - executable, readable when in PCC, non-modifiable
1 1 1 - non-executable, read/write, modifiable
``` pretation, in order to derive, from logical combinations of the N permission flags, state for an enlarged set of permissions, where the enlarged set comprises at least N+1 permissions. This provides a mechanism for encoding additional permissions into capabilities without increasing the number of permission flags required, whilst still retaining desirable behaviour.

19 Claims, 14 Drawing Sheets

(51) Int. Cl.
*G06F 9/38* (2018.01)
*G06F 12/14* (2006.01)

(52) U.S. Cl.
CPC ........ *G06F 9/30189* (2013.01); *G06F 9/3557* (2013.01); *G06F 9/3861* (2013.01); *G06F 12/1458* (2013.01)

(58) Field of Classification Search
CPC .... G06F 9/3861; G06F 12/1458; G06F 9/324; G06F 12/1441; G06F 9/30192; G06F 9/3013
See application file for complete search history.

(56) References Cited

U.S. PATENT DOCUMENTS

2012/0042144 A1\* 2/2012 Grisenthwaite ....... G06F 12/145
711/163
2014/0331019 A1 11/2014 Parker et al.

FOREIGN PATENT DOCUMENTS

| GB | 2482700 | 2/2012 |
| GB | 2544315 | 5/2017 |
| WO | 2012/020236 | 2/2012 |

OTHER PUBLICATIONS

International Search Report and Written Opinion of the ISA for PCT/GB2018/051117 dated Jul. 3, 2018, 14 pages.

\* cited by examiner

A)  SET  PR1 = 140000  ⟶ trigger error

B)  SET  PR1 = 140000

LD  R5,  PR1  ⟶ trigger error

ALTERNATIVE INTERPRETATION  (ASSUMING ONE W BIT AND ONE R BIT FOR EASE OF ILLUSTRATION)

XRW
0 0 0 - non-executable, no access, modifiable
0 0 1 - non-executable, write only, modifiable
0 1 0 - non-executable, read only, modifiable
0 1 1 - non-executable, read/write, modifiable
1 0 0 - executable, no-access, non-modifiable
1 0 1 - non-executable, writeable, modifiable
1 1 0 - executable, readable when in PCC, non-modifiable
1 1 1 - non-executable, read/write, modifiable

FIG. 9

APPARATUS AND METHOD FOR INTERPRETING PERMISSIONS ASSOCIATED WITH A CAPABILITY

This application is the U.S. national phase of International Application No. PCT/GB2018/051117 filed Apr. 27, 2018 which designated the U.S. and claims priority to GB Application No. 1708393.2 filed May 25, 2017, the entire contents of each of which are hereby incorporated by reference.

The present technique relates to the field of data processing.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

A number of capability storage elements (for example registers) may be provided for storing capabilities for access by the processing circuitry of a data processing apparatus. Each capability can include a number of permission flags identifying one or more permissions associated with the capability, for example to restrict the use of the capability to certain types of operation, certain modes of operation of the processing circuitry, etc. For instance, considering a bounded pointer within such a capability storage element, this may identify a non-extendible range of memory addresses accessible by the processing circuitry, along with one or more permission flags identifying associated permissions. Whilst the processing circuitry may be allowed to take steps to reduce the range and/or clear permission flags associated with any particular bounded pointer available to it, it cannot in normal operation extend the range, or set permission flags, in order to seek to increase the capability afforded to the processing circuitry by that bounded pointer.

It would be desirable to allow the number of permissions associated with a capability to be extended, but the number of bits used to encode a capability is typically constrained, for example by the size of the capability storage elements in which the capabilities are stored.

In a first example configuration, there is provided an apparatus comprising: processing circuitry to execute instructions in order to perform operations; and a capability storage element accessible to the processing circuitry and arranged to store a capability used to constrain at least one operation performed by the processing circuitry when executing said instructions, said capability identifying a plurality N of default permissions whose state, in accordance with a default interpretation, is determined from N permission flags provided in said capability, in accordance with the default interpretation each permission flag being associated with one of the default permissions; the processing circuitry being arranged to analyse the capability in accordance with an alternative interpretation, in order to derive, from logical combinations of the N permission flags, state for an enlarged set of permissions, the enlarged set comprising at least N+1 permissions.

In another example configuration, there is provided a method of interpreting permissions associated with a capability in an apparatus comprising processing circuitry to execute instructions in order to perform operations, and a capability storage element accessible to the processing circuitry and arranged to store the capability for use in constraining at least one operation performed by the processing circuitry when executing said instructions, the capability identifying a plurality N of default permissions, and the method comprising: providing N permission flags within said capability, such that in accordance with a default interpretation a state of the default permissions is determined from said N permission flags and each permission flag is associated with one of the default permissions; and analysing the capability in accordance with an alternative interpretation, in order to derive, from logical combinations of the N permission flags, state for an enlarged set of permissions, the enlarged set comprising at least N+1 permissions.

In a still further example configuration, there is provided an apparatus comprising: processing means for executing instructions in order to perform operations; and capability storage element means for access by the processing circuitry and for storing a capability used to constrain at least one operation performed by the processing means when executing said instructions, said capability identifying a plurality N of default permissions whose state, in accordance with a default interpretation, is determined from N permission flags provided in said capability, in accordance with the default interpretation each permission flag being associated with one of the default permissions; the processing means for analysing the capability in accordance with an alternative interpretation, in order to derive, from logical combinations of the N permission flags, state for an enlarged set of permissions, the enlarged set comprising at least N+1 permissions.

In a yet further example configuration, there is provided a virtual machine computer program comprising program instructions to control a host data processing apparatus to provide an instruction execution environment corresponding to the apparatus of the first example configuration discussed above. In one embodiment a computer-readable storage medium may be provided for storing the virtual machine computer program.

The present technique will be described further, by way of example only, with reference to embodiments thereof as illustrated in the accompanying drawings, in which:

FIG. 9 is a table schematically illustrating the state of an enlarged set of permissions in accordance with the alternative interpretation in one embodiment, as determined from the execute, read and write permission bits stored within the capability;

Figure 11:
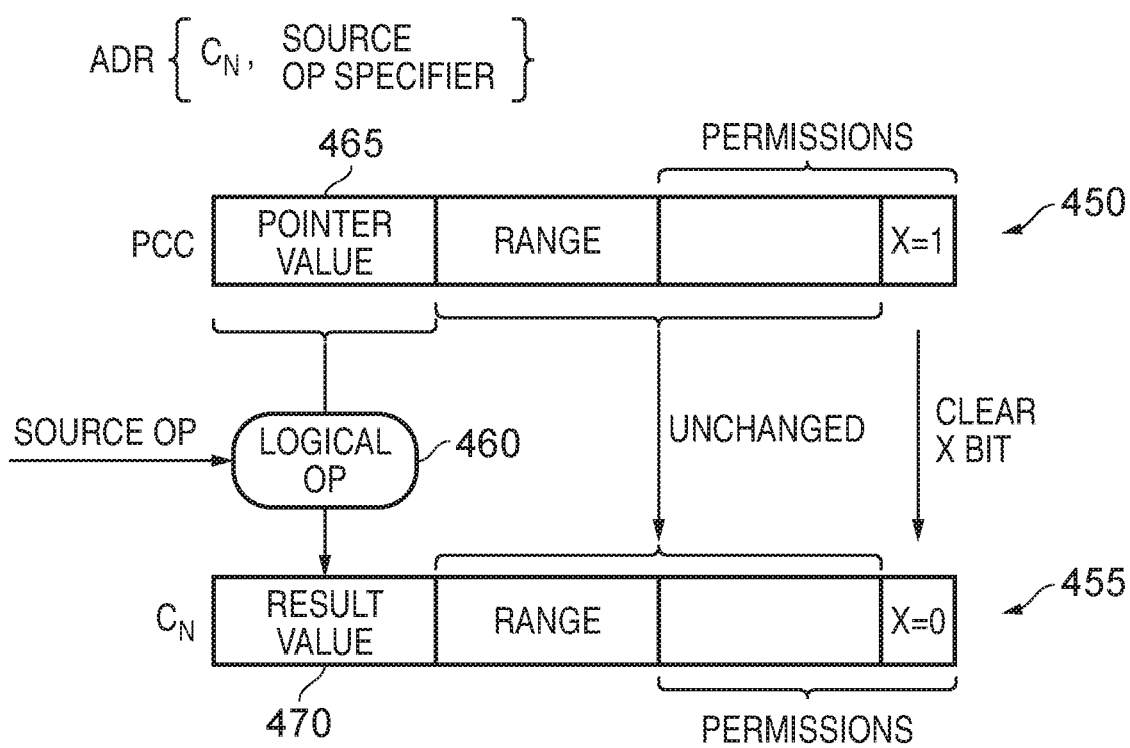
Figure 12:
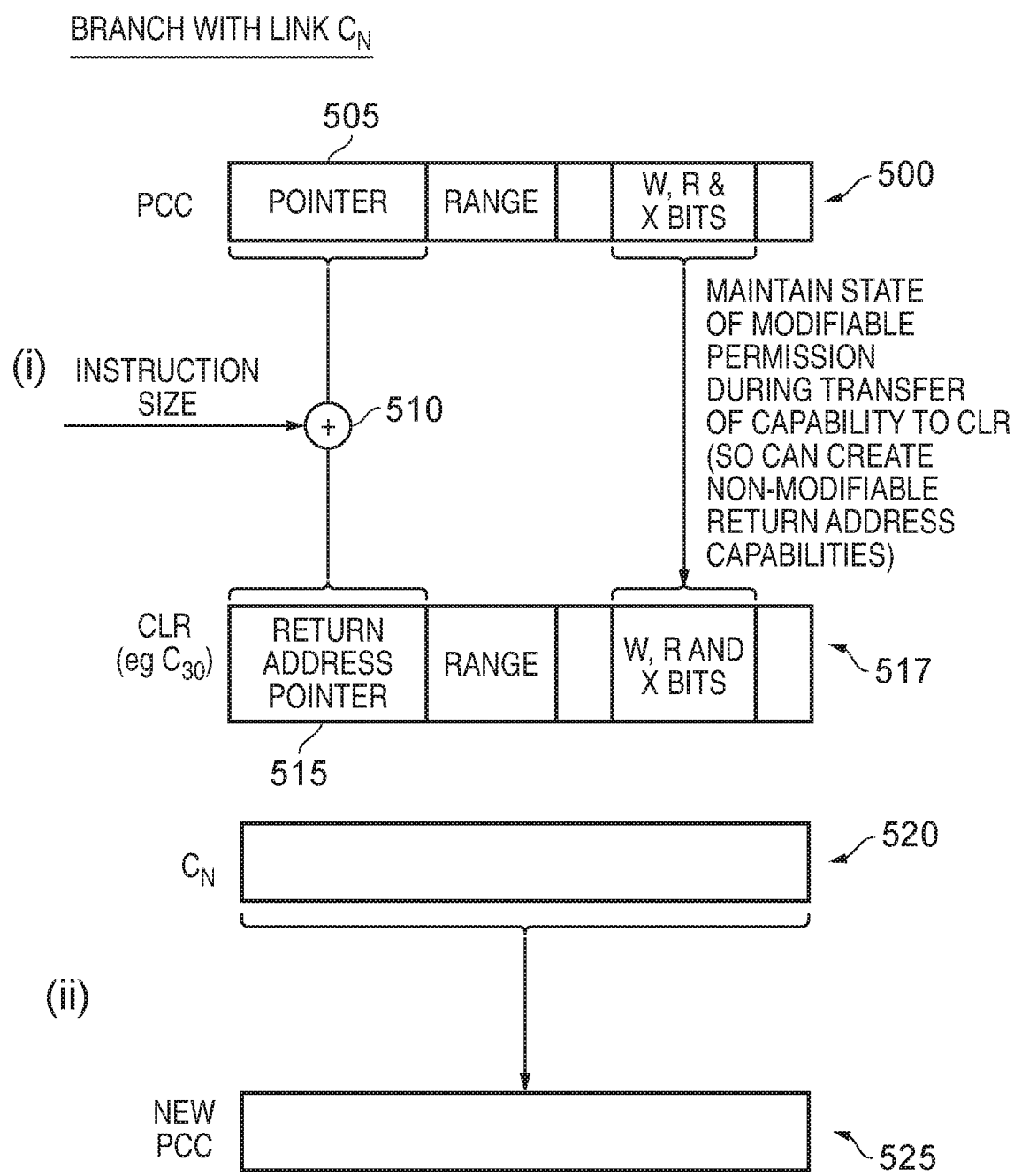
Figure 13:
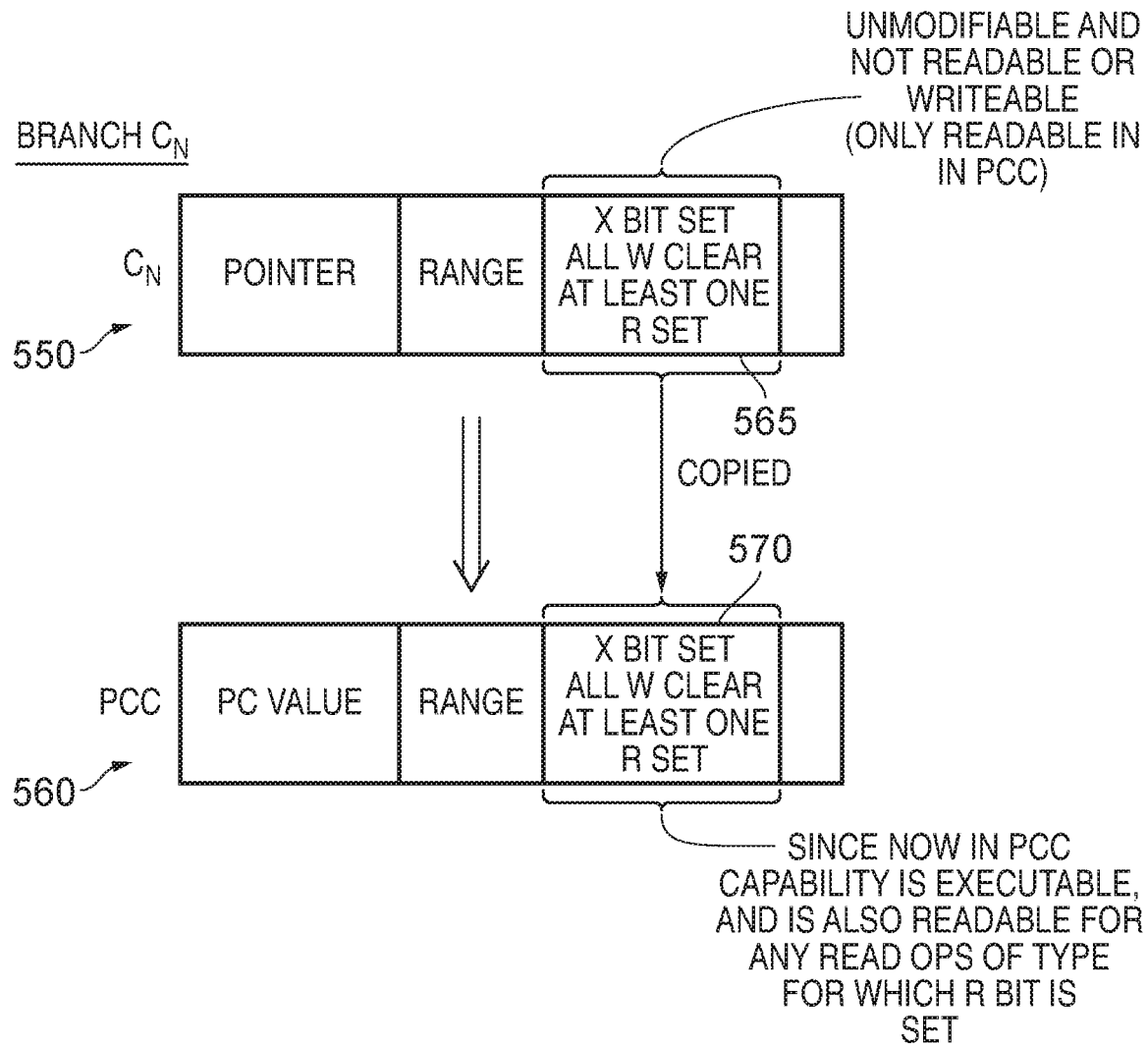
Figure 14:
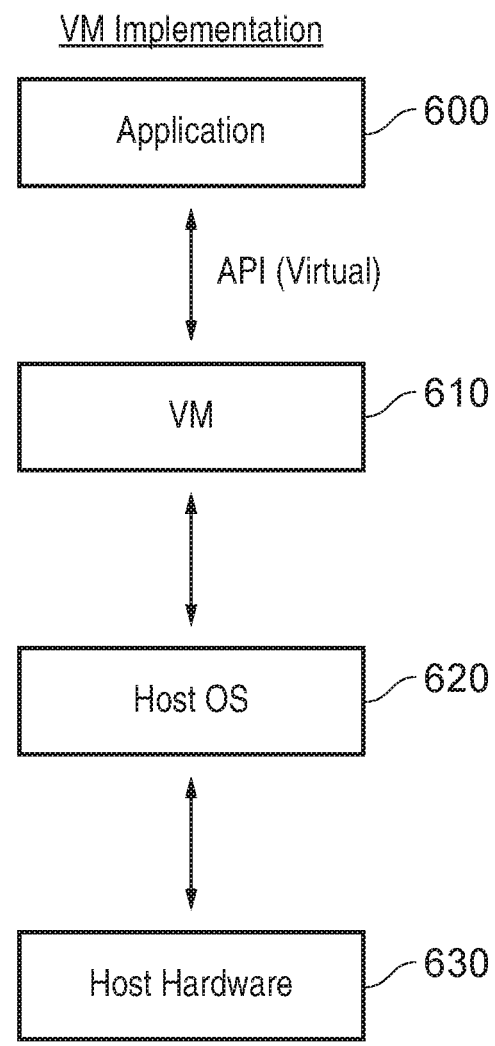

FIG. 11 schematically illustrates operations performed on executing an address generation instruction in accordance with one embodiment;

FIG. 12 schematically illustrates operation of a branch with link instruction in accordance with one embodiment;

FIG. 13 schematically illustrates execution of a branch instruction in accordance with one embodiment; and FIG. 14 illustrates a virtual machine implementation that may be used.

Before discussing the embodiments with reference to the accompanying figures, the following description of embodiments is provided.

As mentioned earlier, there is an increasing interest in capability-based architectures in which certain capabilities are defined for a given process, and an error can be triggered if there is an attempt to carry out operations outside the defined capabilities. Various types of capabilities may be defined, but one type of capability is a bounded pointer (which in one embodiment incorporates both a pointer value and associated range and permissions information).

An apparatus adopting such a capability-based architecture will typically have storage elements (also referred to herein as bounded pointer storage elements, or more generally capability storage elements) that are used to store the capabilities. The storage elements can be registers (also referred to herein as bounded pointer registers or capability registers) and/or can be memory locations in general purpose memory, for example a location on a stack memory. Certain instructions can be used to reference such storage elements in order to access a desired capability, and perform operations dependent on that capability. For example, considering a bounded pointer, execution of such an instruction can cause the bounded pointer to be retrieved, and for the pointer value therein to then be used to derive an address in memory required during execution of the instruction. The pointer value may be used directly to identify the memory address, or may be used to derive the memory address, for example by the addition of an offset to the pointer value. The operation will then be allowed to proceed provided that the memory address is within the range specified by the range information, and any permissions specified in the permissions information are met.

Hence, when using bounded pointers, the pointer value itself may point to, or be used to determine, the address of a data value to be accessed or an instruction to be fetched for execution, for example. However the range and permission information may then be referred to, for example, to ensure that any address accessed is within an allowable range, and being accessed for an allowed purpose. This can be useful for example for ensuring that the address determined from the pointer remains within certain bounds to maintain security or functional correctness of behaviour. By such an approach, it is possible to effectively police memory accesses made by the processing circuitry.

In a typical implementation, the state of each permission may be indicated by an associated permission flag within the capability, with that flag being in a set state or a clear state in order to identify the state of the corresponding permission. When the permission flag is clear, this will typically mean that the associated permission is in the clear state, which in turn indicates that the processing circuitry has that permission revoked for the capability in question. Conversely, when the permission flag is set, this may mean that the associated permission has a set state, and that hence the processing circuitry may be granted that permission for the capability. However, in one embodiment, it may still be necessary to refer to other control information before deciding whether the processing circuitry is in fact granted that permission, and hence the set state for a permission as identified by the associated permission flag may be used to indicate that the processing circuitry is granted that permission for the capability in question, subject to any overriding control information.

It would be desirable to allow an increased number of permissions to be specified for individual capabilities, as such an approach would allow enhanced flexibility in the use of capabilities. However, capability encoding space is typically quite constrained. For instance, considering the example of a bounded pointer, a bounded pointer capability also needs to be able to specify a pointer value, and information indicative of the associated range, and accordingly the number of bits left for the specification of permission flags may mean that it is not possible to merely continue to add further permission flags to the capability.

The embodiments described herein provide an efficient mechanism for allowing the number of permissions associated with a capability to be extended in such situations.

In particular, in one embodiment an apparatus is provided that has processing circuitry for executing instructions in order to perform operations, and a capability storage element accessible to the processing circuitry and arranged to store a capability used to constrain at least one operation performed by the processing circuitry when executing the instructions. The capability may identify a plurality N of default permissions whose state, in accordance with a default interpretation, is determined from N permission flags provided in the capability. In accordance with the default interpretation, each permission flag may be associated with one of the default permissions. As such, there may be a 1:1 correspondence between the permission flags and the default permissions.

However, in accordance with the described embodiments, the processing circuitry is arranged to analyse the capability in accordance with an alternative interpretation, in order to derive, from logical combinations of the N permission flags, state for an enlarged set of permissions, where the enlarged set comprises at least N+1 permissions.

By such an approach, it is possible to extend the number of permissions associated with a capability, but without increasing the number of permission flags. Further, the approach provides a very flexible mechanism, since the same permission flags can be used to support both the default interpretation and the alternative interpretation. It is hence possible for the capabilities to be used within systems that support both the default interpretation and the alternative interpretation, but also to be used in systems that support only one of those interpretations. This for example can provide backwards compatibility by also allowing the capabilities to be used with an instance of processing circuitry that only supports the default interpretation.

The enlarged set of permissions can take a variety of forms, but in one embodiment comprise the plurality N of default permissions, and at least one additional permission.

This hence allows at least one "new" permission to be inferred for the capability through use of the alternative interpretation of the N permission flags. This "new" permission could be a permission not previously provided within the capability-based architecture, or could be a permission that was only previously provided on a more global scale, rather than being a permission that could be set or cleared for individual capabilities.

In one example embodiment, the enlarged set of permissions includes a modifiable permission that, when in a clear state, identifies that the capability is unmodifiable by one or more capability modifying instructions. By such an approach, individual capabilities can be marked as being unmodifiable, which can provide enhanced security in certain situations.

In one embodiment, the modifiable permission, when in a set state, allows the N permission flags provided in the capability to be transitioned from a set value to a clear value, subject to any overriding control information preventing modification. In some instances, there may be no overriding control information, and hence the modifiable permission, when in the set state, directly indicates that the permission flags can be transitioned from the set value to the clear value. However, in other embodiments, there may be additional control information that needs to be referred to before it can be confirmed that the modifiable permission being in the set state does indeed allow the permission flags to be selectively cleared.

Consistent with general practice with regard to capabilities, a process whose activities are constrained by a capability may not be allowed to modify the capability in a way that restores cleared permission flags to the set value, even when the modifiable permission is in the set state. For this reason, when the modifiable permission is in the set state, this may allow the permission flags to be transitioned from a set value to a clear value, but may not allow permission flags that are clear to be changed to a set value.

Whilst the setting of the modifiable permission has been described with reference to the ability to alter values of permission flags, the modifiable permission can also affect other fields within the capability. For example, subject to other mechanisms preventing the capability from being modified, when the modifiable permission is in the set state, the capability may be modified by general capability modifying instructions, which may for example clear permission flags, reduce bounds, and/or change the address of the pointer value, in this instance it being assumed that the capability is a bounded pointer.

The default permissions can take a variety of forms, but in one embodiment comprise one or more memory access permissions to identify, when in a clear state, that the capability is prevented from being used by one or more memory access operations to access data in memory, and an executable permission to identify, when in a clear state, that the capability, when forming a program counter capability, is prevented from being used to fetch instructions from the memory. These default permissions can hence be used to constrain operations that seek to access the memory address space.

The one or more memory access permissions can take a variety of forms, but in one embodiment comprise at least one write permission to identify whether the capability is prevented from being used to perform at least one type of write operation to the memory, and at least one read permission to identify whether the capability is prevented from being used to perform at least one type of read operation from the memory. Hence, separate permissions can be provided for read and write operations, and indeed multiple write permissions and/or multiple read permissions may be specified. Use of multiple permissions can for example be used to identify that write or read operations can be performed when executing certain types of instructions but not others, when the processing circuitry is operating in some modes but not others, and/or may specify that the availability to read or write is dependent on the information being read or written. For example, separate read and write permissions may be specified for situations where the information being read or written is itself a capability, or instead is a standard data value.

In embodiments where the default permissions include an executable permission, and the enlarged set of permissions includes at least the addition of the earlier-described modifiable permission, then in accordance with the alternative interpretation of the N permission flags, the capability may be prevented from having both the executable permission and the modifiable permission in a set state at the same time. Instead, certain transitions in the values of the permission flags may cause the executable permission to transition from the set to the clear state whilst the modifiable permission changes from the clear to the set state, and vice versa.

In one embodiment, the N permission flags comprise at least one write bit, at least one read bit and an execute bit whose values, in accordance with the default interpretation, identify the state of the at least one write permission, the at least one read permission and the execute permission, respectively. In one such embodiment, in accordance with the alternative interpretation the processing circuitry is arranged to determine that the modifiable permission is in the set state when at least one write bit is set, or the execute bit is clear. This provides a great deal of flexibility in being able to specify when the modifiable permission is in the set state for the particular capability.

Whilst in accordance with the default interpretation there is typically a 1:1 correspondence between each permission flag and an associated default permission, in one embodiment this is not the case when interpreting the permission flags in accordance with the alternative interpretation. Instead, logical combinations of the permission flags are used to determine the state of at least one of the default permissions when the alternative interpretation is being used.

For example, in one embodiment, in accordance with the alternative interpretation the processing circuitry is arranged to determine that the executable permission is in the set state when both the execute bit is set and all of the at least one write bits are clear. Hence, in accordance with the alternative interpretation it is not enough merely for the execute bit to be set in order to determine that the executable permission is in the set state, but instead it is also necessary for any write bit provided within the capability to also be clear. This provides a particular efficient encoding to enable the enlarged set of permissions to be encoded within the available N permission flags, since it is generally considered undesirable to allow a capability to have both a write permission set and an executable permission set for the same area of memory, and in accordance with the proposed encoding this option is prevented.

In one embodiment, the read permission is also interpreted not only using the associated read bit, but also additional information, when using the alternative interpretation. In particular, for each read permission, in accordance with the alternative interpretation the processing circuitry may be arranged to determine that that read permission is in the set state when the associated read bit is set, and either the modifiable permission is in the set state or the capability is being used as a program counter capability. Generally, it is hence necessary in accordance with the alternative interpretation for the modifiable permission to be in the set state in order for any read permission to be granted. However, selective readability may be given in one particular example where the capability is non-modifiable, in particular where the capability is being used as a program counter capability. In that example, the capability may be marked as executable and non-modifiable, but may still be allowed to be readable in particular circumstances whilst the capability is in the program counter capability, dependent on the associated read bit.

In both the default interpretation and the alternative interpretation, changes in permissions are brought about by transitioning the state of the permission flags. As mentioned earlier, when a process is given permission to alter a capability, it will generally only be able to alter it in a way that infers additional constraints, rather than in a way that relaxes the constraints of the capability. With regard to permissions, this means that generally the process will only be able to clear permission flags rather than set them, and accordingly the transitions in the permissions occur through the clearing of one or more of the permission flags. Since in accordance with the alternative interpretation logical combinations of the permission flags are used in order to determine the state of the various permissions, it is possible for the clearing of one or more permission flags to allow at least one of the permissions to move into the set state. For example, the modifiable permission can be moved into the set state by clearing the execute flag.

The transition in the value of certain permission flags can also be associated with the processing of certain instructions. For example in one embodiment the processing circuitry may be arranged, in response to executing an address generation instruction to generate a result capability from a program counter capability, to clear the execute bit within the result capability. This can bring about some interesting changes in behaviour, that can be very useful in practice. For example, it may mean that a capability that is executable but non-modifiable whilst being used as a program counter capability, may be used to generate a result capability stored in a general purpose capability register that is then modifiable. It may also for example then be readable, dependent on the one or more read permission bits. In particular, in one embodiment, when the program counter capability has the execute bit set and all of the at least one write bits clear, the clearing of the execute bit in the result capability causes the result capability to be considered, in accordance with the alternative interpretation, to have both its modifiable permission in the set state and each read permission in the state indicated by the associated read bit.

As another example of how permissions may be managed when executing one or more particular types of instruction, the processing circuitry may be responsive to executing a branch with link instruction to generates a return address capability from a program counter capability such that, when the modifiable permission is in the clear state within the program counter capability, the return address capability also has its modifiable permission in the clear state. By such an approach, it is possible to create non-modifiable return address capabilities, which can provide enhanced security.

In one embodiment the apparatus may have one or more general purpose capability storage elements and a program counter capability storage element. In one such embodiment, when the capability stored in one of said one or more general purpose capability storage elements has the execute bit set, at least one of the read bits set and all of the at least one write bits clear, the processing circuitry is constrained, in accordance with the alternative interpretation, to solely use said capability to form a new program counter capability to be stored in the program counter capability storage element. However, once said capability is stored in the program counter capability storage element, the new program counter capability is considered, in accordance with the alternative interpretation, to have in the set state each read permission whose associated read bit is set, thereby enabling literal values to be read from memory by the processing circuitry. Hence, a task can be allocated a capability that it can only use to branch to in due course when executing a branch instruction, and hence the capability can only be used as an entry point to another routine. However, when the branch takes place, and that capability is loaded into the program counter capability, that other routine can then make use of that capability in other ways, for example by enabling literal values to be read from memory using for example load instructions that generate an address with reference to the program counter capability.

In one embodiment, the processing circuitry may be arranged to always use the alternative interpretation. However, in a further embodiment a configuration storage element may be provided that stores a configuration value that is used to indicate which of the default interpretation and the alternative interpretation is to be applied by the processing circuitry. This hence provides a mechanism to allow switching between the default interpretation and the alternative interpretation over time, as desired.

The above described permissions can be associated with various different types of capability used by the apparatus, but in one embodiment the capability is a bounded pointer, and the permissions are used to control usage by the processing circuitry of a pointer value specified within the capability.

Particular embodiments will now be described with reference to the Figures.

Figure 1:
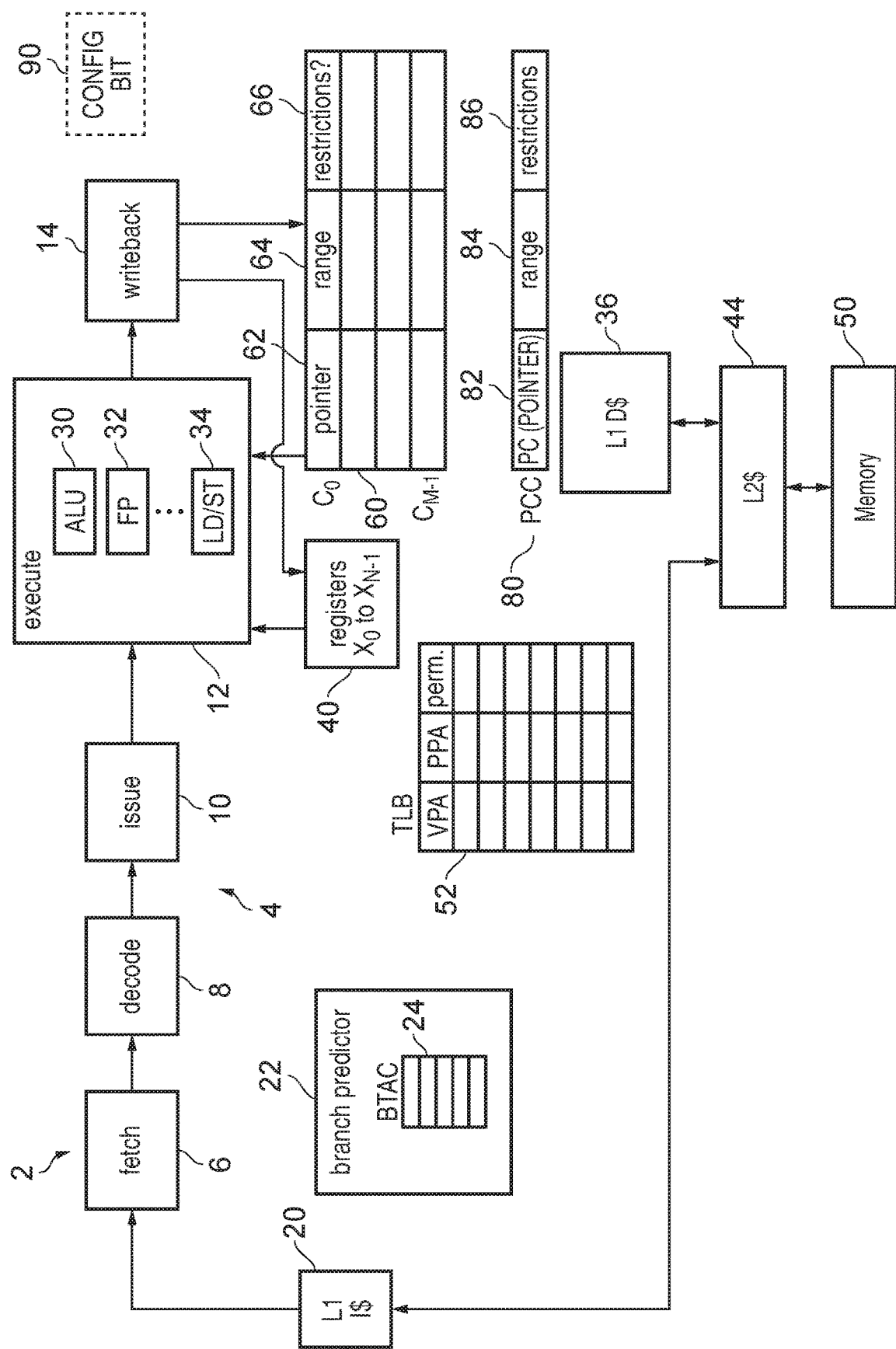
FIG. 1 is a block diagram of an apparatus in accordance with one embodiment.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
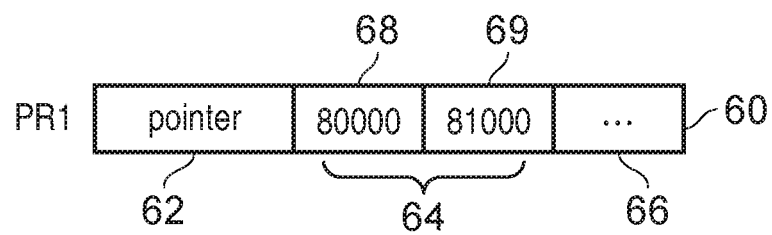
FIG. 2 shows examples of types of instruction for which an error may be triggered if there is an attempt to set or access a pointer value within a set of bounded pointer storage elements where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range 64 and permissions 66 information could be set in different ways. For example secure code, or an operating system or hypervisor, may specify the range and permissions allowed for a given pointer. For example, the instruction set architecture may include a number of instructions for setting or modifying the range information 64 and/or permissions 66 for a given pointer 62, and execution of these instructions could be restricted to certain software or certain modes or exception levels of the processor 4. However, in addition to, or as an alternative to, such a privilege-based mechanism for modifying capabilities, in the embodiments described herein a modifiable permission can be derived for individual capabilities. Hence, in one example arrangement, the ability to modify a capability may depend on whether the modifiable permission for that capability is in a set state, or whether the process seeking to modify the capability has the required privilege. Alternatively, it may be required that both the modifiable permission is in a set state, and the process seeking to modify the capability has the required privilege, before allowing a capability to be modified.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Any particular range of memory addresses identified by a bounded pointer within a bounded pointer register may contain data, instructions and/or other capabilities (i.e. other bounded pointers). Hence, it will be appreciated that at any point in time the processing circuitry's ability to access memory is defined by a set of capabilities comprising the capabilities identified in the bounded pointer registers and any further capabilities accessible via the capabilities held in those bounded pointer registers, and this set of capabilities will be referred to herein as a capability domain.

The range information and any associated restrictions specified in the PCC register 80 can be set in a variety of ways. However, in one embodiment that information is determined using one or more of the bounded pointers available to the processing circuitry in a current capability domain, so that no memory address can be accessed using PCC based bound checks that resides outside the memory address range(s) identified for the current capability domain.

Figure 3:
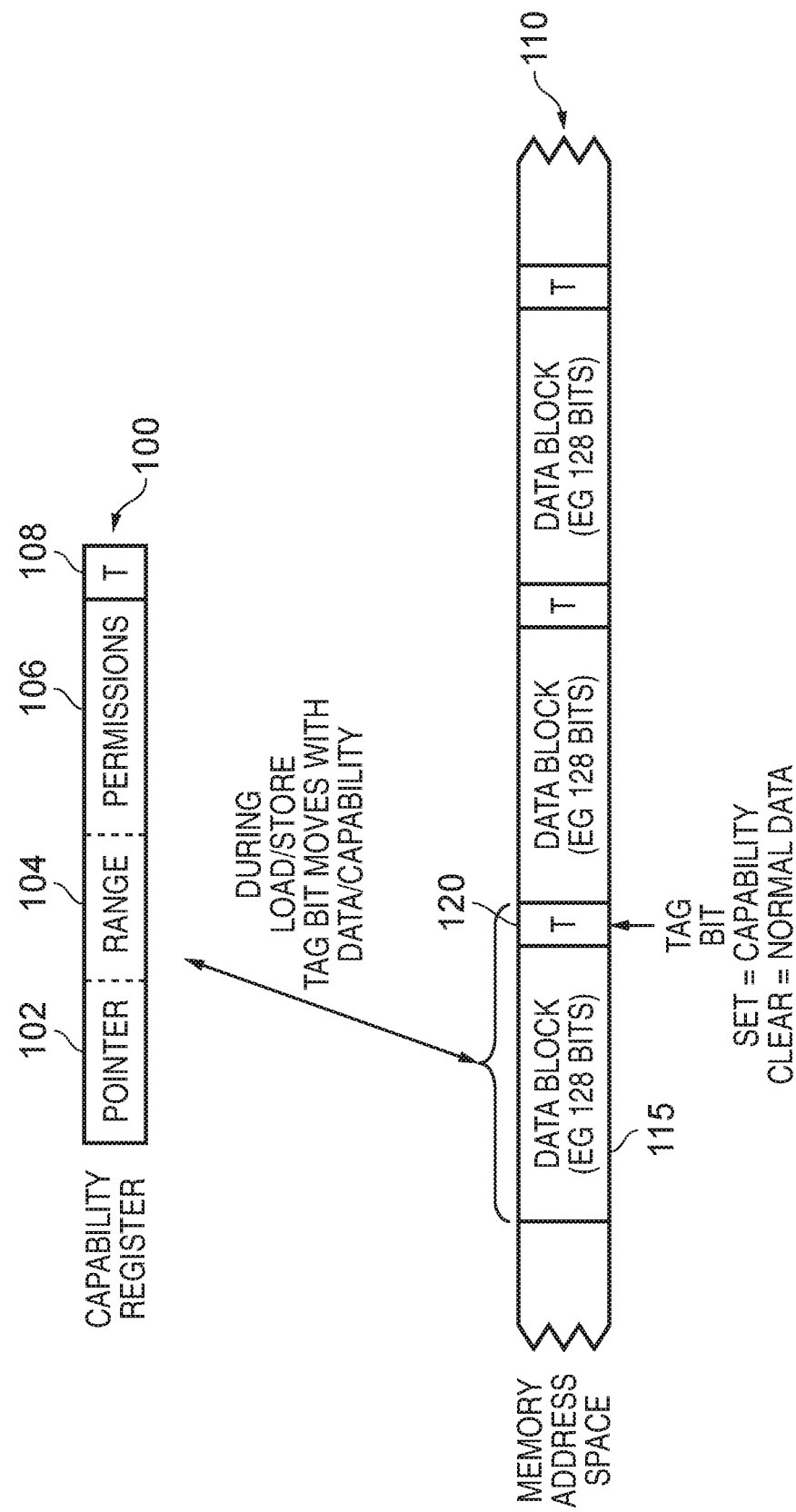
FIG. 3 illustrates the use of a tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

As discussed earlier, it would be desirable to increase the number of permissions that could be associated with individual capabilities, but without a proliferation in the number of permissions flags required. In particular, encoding space within the capabilities is often at a premium, and there may not be sufficient space to add further permission flags for each additional permission that it would be desirable to encode.

Figure 4:
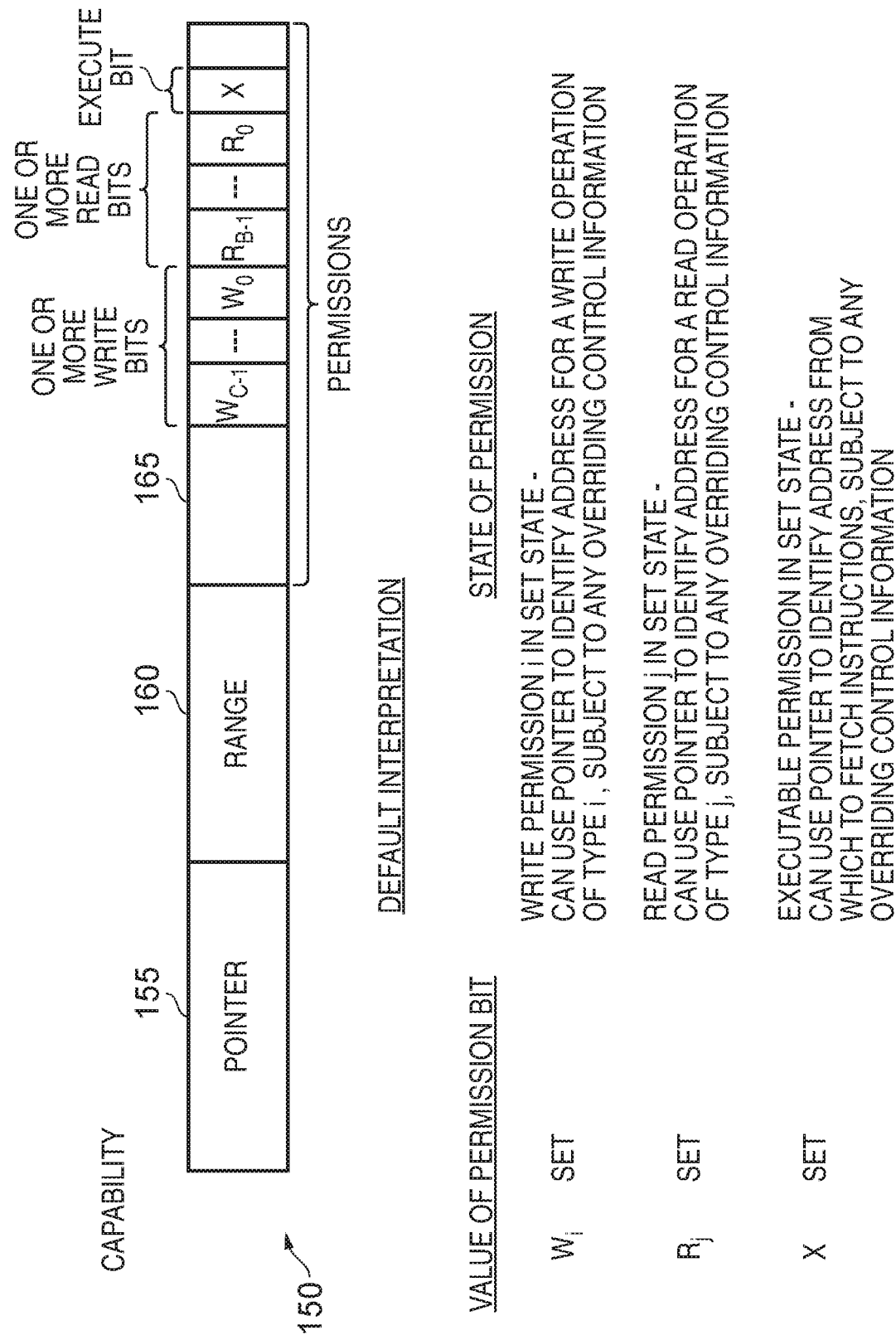
FIG. 4 is a diagram illustrating permission bits that may be provided within a bounded pointer capability in accordance with one embodiment, along with a default interpretation of those permission bits.

FIG. 4 gives an example of permission flags that may be provided within an existing capability, considering by way of example a bounded pointer. The bounded pointer capability 150 includes a pointer field 155 for storing a pointer value, and a range field 160 for storing range information to identify an allowable range of addresses that may be accessed using the pointer value within the pointer field 155. A number of permission fields 165 can then be provided for storing one or more permission flags. In the described embodiment, each permission flag takes the form of a single bit value which can set or clear. For the purposes of the described embodiments, it will be assumed that the capability 150 has one or more write permissions, one or more read permissions, and an executable permission, and a number of permission bits are provided within the fields 165 corresponding to those various permissions. Accordingly, considering in general a situation where there may be C different write permissions and B different read permissions, then C write permission bits $W_0$ to $W_{C-1}$ may be provided, and B read permission bits $R_0$ to $R_{B-1}$ may also be provided. Each read or write permission may be associated with a particular type of operation or a particular mode of operation of the processor, or indeed different permissions may be associated with different types of information being accessed, so that for example different write and read permissions may be set dependent on whether the information being accessed is itself a capability, or a normal data value. Whilst for the sake of illustration it has been assumed that there are multiple read and write permission bits associated with corresponding read and write permissions, in an alternative embodiment there may be a single read permission and a single write permission, with the state of those read and write permissions being represented by a single read permission bit and a single write permission bit.

As also shown in FIG. 4, additional permissions may be encoded within the capability, and hence for example an executable permission may be indicated by the value of an associated execute (X) bit.

In accordance with a default interpretation of the permission bits within the permission fields 165, each permission bit is associated with a corresponding permission, and hence directly identifies the state of that associated permission. This is illustrated further in FIG. 4. Accordingly, if the permission bit $W_i$ is set, this indicates that the write permission i is in the set state, and hence the pointer value within the field 155 can be used to identify the address for a write operation of type i, subject to any overriding control information. Similarly, if the permission bit $R_j$ is set, then this means that the read permission j is in the set state, and hence the pointer value can be used to identify an address for a read operation of type j, subject to any overriding control information. Finally, if the execute bit X is set, this means that the executable permission is in the set state, and hence the pointer value can be used to identify an address from which to fetch instructions, again subject to any overriding control information.

Conversely, if the associated permission bit is cleared, this means that the associated permission is revoked for the capability, and hence accesses of the type associated with that permission cannot be performed using the associated capability.

In the embodiments described hereafter, the same permission bits are retained, but they may be interpreted differently in order to derive state for an enlarged set of permissions. In particular, in accordance with an alternative interpretation, logical combinations of the permission bits are used to identify the state of an increased set of permissions. In one embodiment, the increased set of permissions includes all of the write, read and executable permissions discussed by way of example with reference to FIG. 4, i.e. the permissions available in accordance with the default interpretation of the W, R and X permission bits, but in addition at least one further permission is also derivable from the value of those W, R and X permission bits. In particular, in one embodiment a modifiable permission is also provided in association with the capability, without requiring any additional permission bits to be specified.

The manner in which the state of the modifiable permission is determined from the above described permission bits in one embodiment is illustrated with reference to the flow diagram of FIG. 5. At step 200, it is determined whether the alternative interpretation is being used, and if not this means that the default interpretation applies, the process branching to step 205. In accordance with the default interpretation, the modifiable permission does not exist. Instead, the ability to modify any capabilities will be defined by control information elsewhere, and will not be defined on a capability-by-capability basis using permission bits within each capability.

However, if the alternative interpretation is being used, the process proceeds to step 210 where it is determined whether at least one of the W bits is set. If so, the process proceeds to step 220 where it is determined that the modifiable permission is in the set state. As such, this means that the capability can be modified by certain capability modifying instructions, unless other control state prevents such modification. For example there could still be some general overriding control information that means that a particular capability is not modifiable even if the modifiable permission determined from the permission bits indicates that it is not prevented from being modified.

If at step 210 it is determined that none of the W bits are set, it is then determined whether the execute bit is clear at step 215. If the execute bit is clear, then this also indicates that the modifiable permission is in the set state, and accordingly the process branches to step 220. However, if the execute bit is in the set state, then the process proceeds to step 225, where it is determined that the modifiable permission is in the clear state. When the modifiable permission is in the clear state, this means that the associated capability cannot be modified. This hence enables individual capabilities to be marked as non-modifiable, which can provide enhanced security within a capability-based architecture.

Further, flexibility is enhanced when using the alternative interpretation, since it is possible to change the values of certain permission bits within a capability to change it from a modifiable state to a non-modifiable state. Further, under specific circumstances, it may be possible to convert non-modifiable capabilities into modifiable ones, for example through use of certain address generation instructions, as will be discussed by way of example later with reference to FIG. 11.

Figure 6:
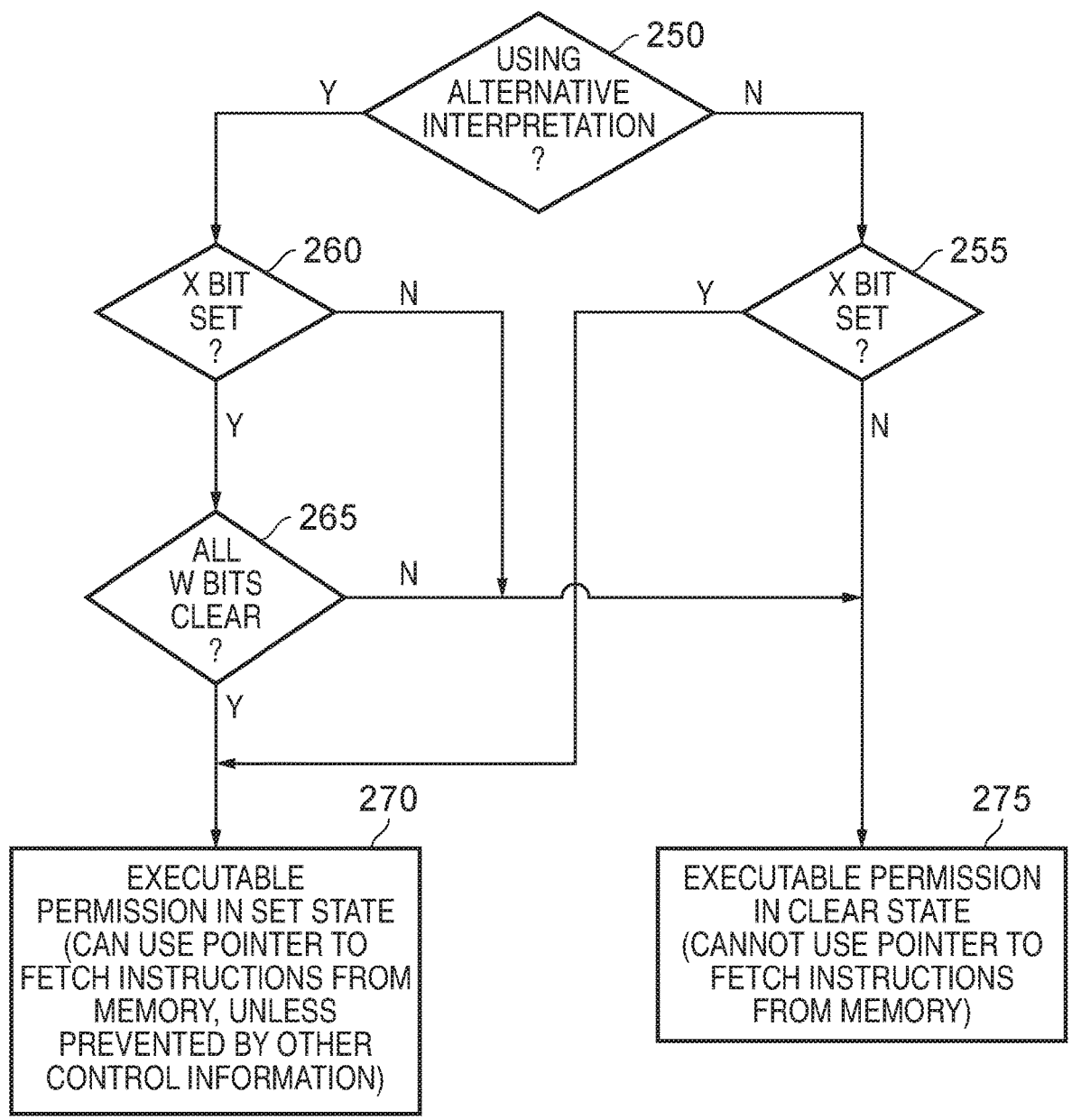
FIG. 6 is a flow diagram illustrating how a state of an executable permission may be determined from the permission bits, dependent on whether the default interpretation is being used or the alternative interpretation is being used.

Whilst when using the default interpretation there was a 1:1 correspondence between individual permission bits and associated permissions, in accordance with the alternative interpretation this is not the case, and logical combinations of the permission bits may be used to determine the state of particular permissions. FIG. 6 for example illustrates how the state of the executable permission may be evaluated dependent on whether the default interpretation or the alternative interpretation is being used.

At step 250, it is determined whether the processing circuitry is using the alternative interpretation. If not, then at step 255 it is determined whether the execute (X) bit is set. If so, then the process proceeds to step 270 where it is determined that the executable permission is in the set state, whereas otherwise the process proceeds to step 275 where it is determined that the executable permission is in the clear state.

However, if it is determined that the alternative interpretation is being used, then the process proceeds to step 260, where it is determined whether the X bit is set. If not, then the process proceeds to step 275, where it is determined that the execute permission is in the clear state. However, if the X bit is set, this in itself does not necessarily mean that the executable permission is in the set state, and instead an additional check is performed at step 265 to determine whether all W bits provided in the capability are clear. It should be noted that if there are multiple W bits within the capability, then all of those W bits need to be checked at step 265, to determine whether they are all clear. Only if all of the W bits are clear will the process proceed to step 270 to determine that the executable permission is in the set state, whereas otherwise the process will proceed to step 275 where it will determined that the executable permission is in the clear state.

Figure 5:
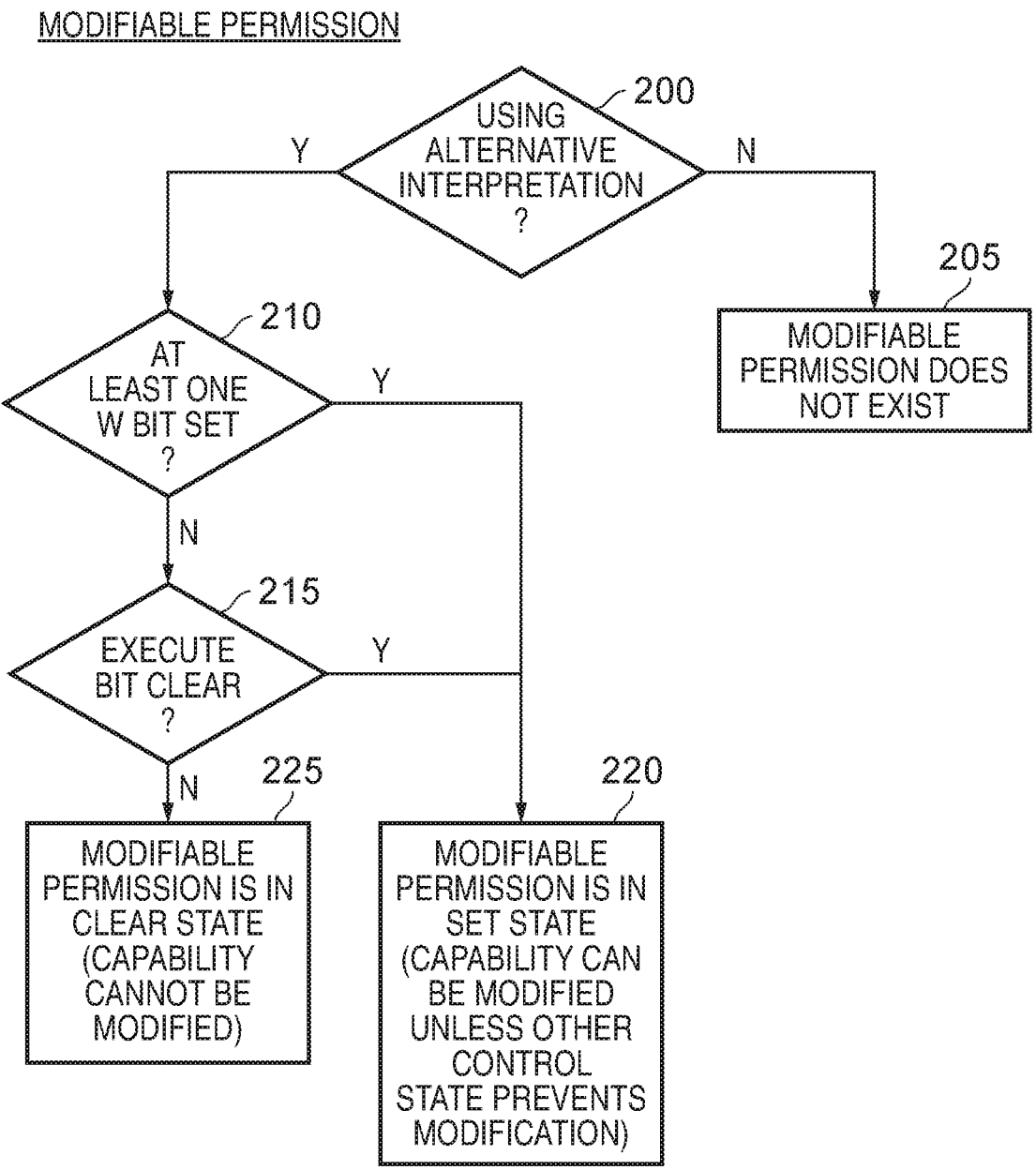
FIG. 5 is a flow diagram illustrating how a state of a modifiable permission may be determined from the permission bits, dependent on whether the default interpretation is being used or an alternative interpretation is being used.

Returning to step 265, it will be appreciated that a determination of all of the W bits being clear at step 265 is the same as determining that the modifiable permission is in the clear state, since it will be recalled from FIG. 5 that the modifiable permission will be in the set state if any of the W bits are set. Accordingly, it will be seen that in the embodiment described with reference to FIGS. 5 and 6, only one of the executable permission and the modifiable permission may be in the set state at any point in time.

Figure 7:
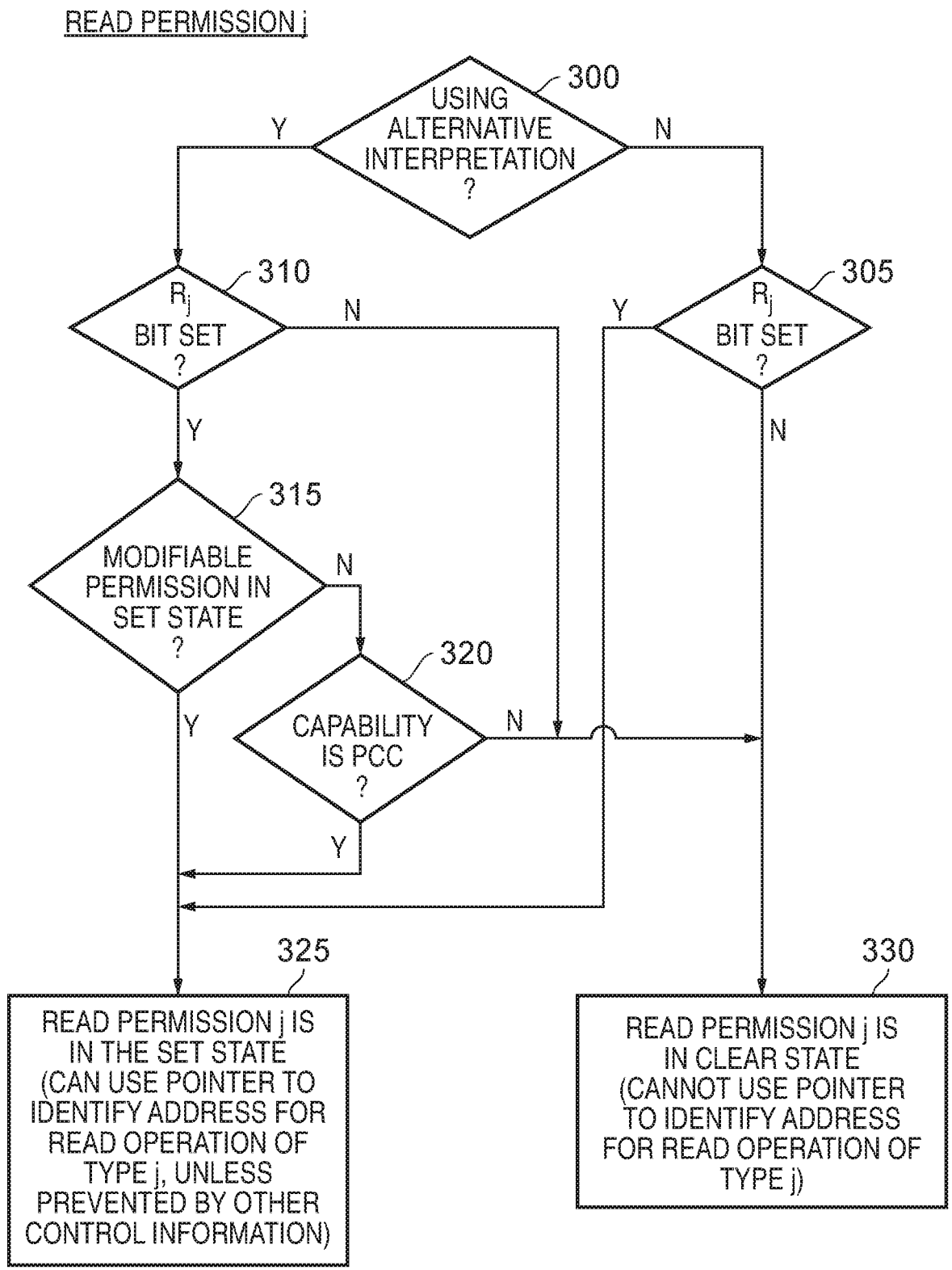
FIG. 7 is a flow diagram illustrating how a state of a particular read permission may be determined from the permission bits, dependent on whether the default interpretation is being used or the alternative interpretation is being used.

FIG. 7 is a flow diagram illustrating how the state of any one of the read permissions may be evaluated dependent on whether the default interpretation or the alternative interpretation is being used. At step 300, it is determined whether the alternative interpretation is being used, and if not it is determined at step 305 whether the associated R permission bit is set. If so, then it is determined that the particular read permission is in the set state at step 325, whereas otherwise it is determined that the particular read permission is in the clear state at step 330.

However, if the alternative interpretation is being used, then the process proceeds to step 310, where it is first determined whether the associated read permission bit is set for the read permission in question. If not, then the process proceeds directly to step 330, where it is determined that the read permission is in the clear state.

However, if the relevant read permission bit is set, then this does not directly mean that the read permission is determined to be in the set state, and instead one or more further checks are required. Firstly, at step 315, it is determined whether the modifiable permission is in the set state. In one embodiment this does not necessarily require directly re-evaluating the modifiable permission, and instead this check can be performed with reference to the W and X bits. In particular, it will be appreciated from the earlier discussion of FIG. 5 that the modifiable permission will be determined to be in the set state when at least one write bit is set or the execute bit is clear, and accordingly that check can be performed at step 315.

If it is determined that the modifiable permission is in the set state, then the process proceeds to step 325 where it is determined that the relevant read permission is in the set state. However, if the modifiable permission is not in the set state, then a further check is performed at step 320, to determine whether the capability is currently being used as a program counter capability. If it is, then even though the modifiable permission is not set, it is still determined that the relevant read permission is in the set state at step 325. Hence, certain non-modifiable capabilities may still be viewed as having at least one readable permission set when those capabilities reside within the PCC register 80.

If at step 320 it is determined that the capability is not currently being used as a program counter capability, then the process proceeds to step 330, where it is determined that the read permission is in the clear state.

Figure 8:
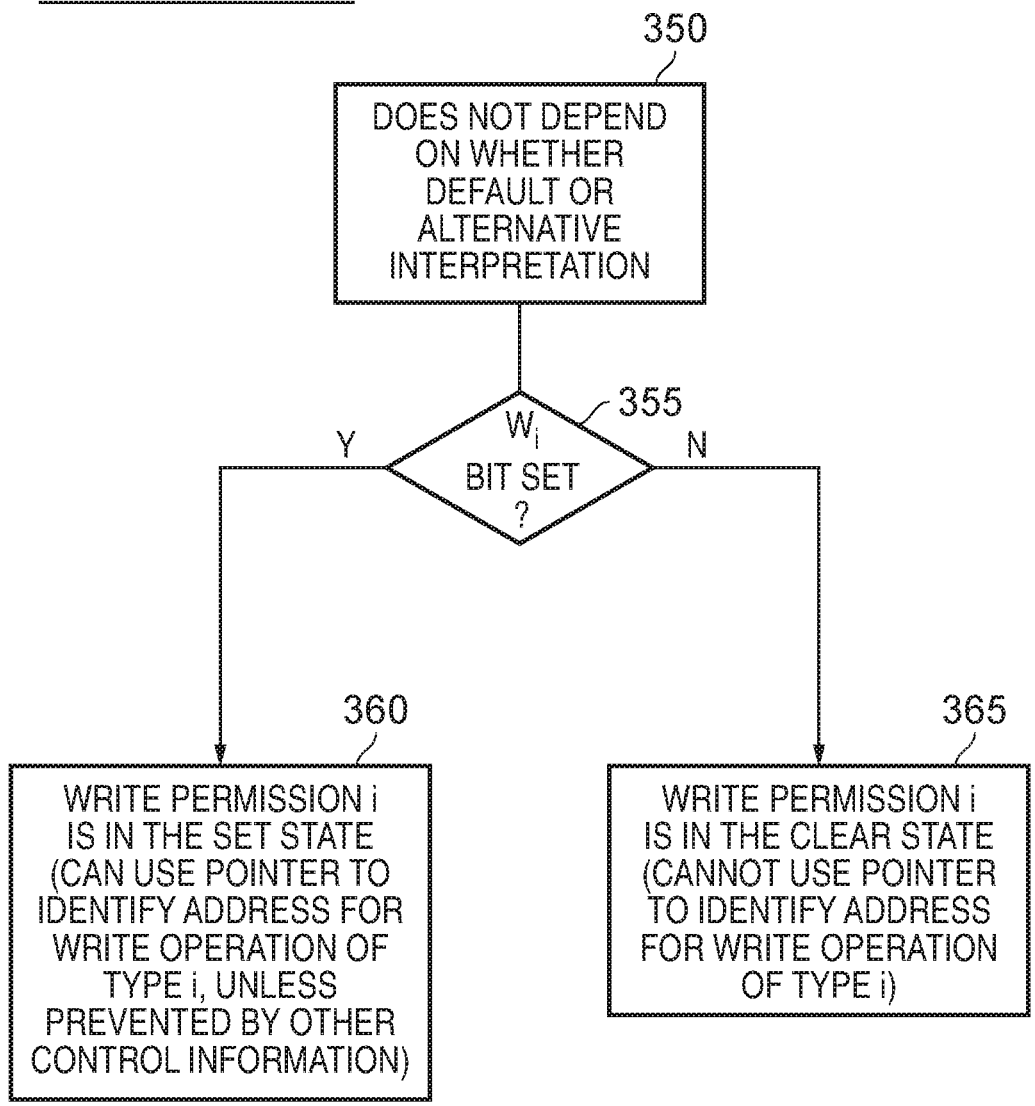
FIG. 8 is a flow diagram illustrating how a state of a particular write permission may be determined from the permission bits, dependent on whether the default interpretation is being used or the alternative interpretation is being used.

FIG. 8 is a flow diagram illustrating how the state of any particular write permission is evaluated in one embodiment. As indicated by box 350, in the described embodiment the write permission is interpreted in exactly the same way, irrespective of whether the default interpretation or the alternative interpretation is being used. In particular, at step 355, it is determined whether the associated write permission bit is set, and if so it is determined that the particular write permission is in the set state at step 360, whereas otherwise it is determined that the particular write permission is in the clear state at step 365.

From the above discussion of FIGS. 5 to 8, it will be appreciated that the status of one or more write permissions, one or more read permissions, an executable permission and a modifiable permission may all be determined using the existing W, R and X permission bits encoded within a capability. No additional modifiable permission bit needs to be added, and accordingly the additional modifiable permission can be encoded into the capability without the need for any additional permission bit encoding space.

FIG. 9 is a table illustrating the state of the four above described different types of permission, dependent on the X, R and W bits. In this example, for ease of illustration, it is assumed that there is only one read permission and one write permission, and hence only a single R bit and a single W bit. In the more general case, as will be appreciated from the flow diagrams of FIGS. 5 to 8, when determining the state of the modifiable and executable permissions (and indeed the readable permission given that that is dependent on whether the modifiable permission is set), logical OR and AND operations will need to be performed in respect of the plurality of W bits as part of the process of assessing whether those permissions are in the set state or the clear state.

Figure 10:
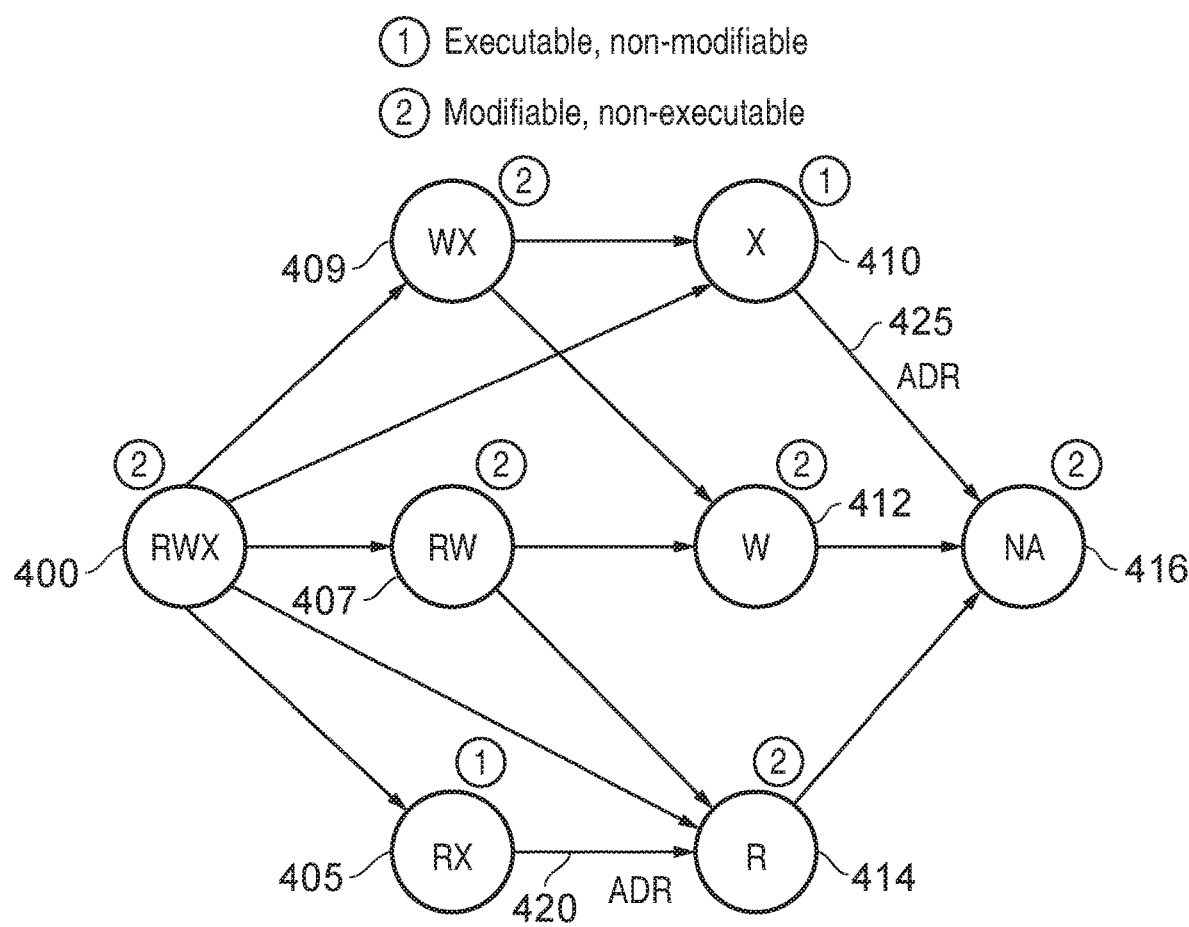
FIG. 10 is a state transition diagram indicating the allowed transitions in the state of the read, write and execute permission bits in one embodiment.

FIG. 10 is a state transition diagram illustrating how, when a capability is marked as modifiable, individual permission bits may be changed from the set value to the clear value in order to bring about transitions in the state of one or more of the permissions. Again, for ease of illustration, it is assumed that there is only a single W permission bit and a single R permission bit, but in the more general case where there are multiple R permission bits and multiple W permission bits, each of those R and W permission bits may be cleared independently.

As shown by the initial state 400, each of the R, W and X bits may initially be set to a logic 1 value. As will be apparent from FIG. 9, this means that the capability is non-executable, but is modifiable, and both read and write operations are allowed. Since the capability is modifiable, individual permission bits can be cleared if desired. By clearing one bit, it is hence possible to transition to either of the states 405, 407, 409. In state 407, the R and W bits are still set, but the X bit is clear, whilst in state 409 the W and X bits are still set, but the R bit is clear. Referring back to FIG. 9, it will be seen that both states 407 and 409 correspond to states where the modifiable permission is in the set state. However, the state 405 (where the R and X bits are set, but the W bit is not) corresponds to a state where the modifiable permission is in the clear state, i.e. the capability is not modifiable.

FIG. 10 shows a number of other possible transitions that can take place, as individual permission bits are cleared. For ease of illustration, the transitions directly from state 400 to 412, or from state 400 to 416, are omitted, but in one embodiment those transitions would also be possible. It should be noted that states 412 and 414 are still states where the capability is modifiable, but state 410 is another state where the capability is non-modifiable. Whilst state 416 is in principle a modifiable state, it represents a state where all of the permission bits have been cleared, and accordingly a process constrained by that capability will not be able to change the permissions within the capability any further. In some embodiments, it may be determined that the state 416 is a non-used state.

Since the states 405, 410 in FIG. 10 represent situations where the capability is non-modifiable, this would appear to preclude a further transition from those states. However, as indicated by the "ADR" symbol used in association with the transitions 420, 425, in one embodiment execution of an address generation instruction may allow the transitions indicated by the paths 420, 425 to occur. This is discussed further with reference to FIG. 11.

As shown in FIG. 11, an address generation instruction may specify a general purpose capability register $C_N$ as a destination register, and may also specify a source operand, either by way of an immediate value within the instruction, or with reference to an integer register whose content specifies an offset value. When such an address generation instruction is executed, the program counter capability within the PCC register 80 is used as a source capability 450. The pointer value 465 is extracted from the PCC 450 and subjected to a logical operation 460 in combination with the source operand. This may for example involve adding an immediate value to the pointer value in order to generate the result value 470, where the address generation instruction specifies an immediate, or could for example involve adding an offset to the pointer value, where that offset is obtained with reference to an integer register, again producing the result value 470. The range and permissions information is then copied across to the result capability 455 essentially unchanged, with the exception of the X bit. In particular, when the address generation instruction is executed, the X bit value is cleared in the result capability. This hence enables the two transitions 420, 425 shown in FIG. 10. In particular, in both instances an executable, non-modifiable capability 450 within the PCC is used to create a result capability 455 which is non-executable but modifiable. This provides a particularly interesting effect for the transition 420, where the PCC 450 was executable and non-modifiable, and only readable when in the PCC register 80, but the result capability 455 generated therefrom is now modifiable and fully readable (as is apparent from comparing the XRW state "110" with the state "010" shown in FIG. 9).

FIG. 12 illustrates the operation of a branch with link instruction in accordance with one embodiment. As shown in FIG. 12, two separate processes are involved in the performance of a branch with link instruction. Firstly a return address capability 517 is generated from the current program counter capability 500. In one embodiment this will involve the pointer value 505 being extracted, and the instruction size added to that pointer value via the add operation 510, in order to generate a return address pointer 515. All of the range and permissions information will then be copied across into the return address capability, which in one embodiment is stored within the capability link register (CLR). The CLR can be provided in a variety of ways, but in one embodiment is a particular one of the general purpose capability registers, for example $C_{30}$. Since a valid program counter capability 500 will be executable and non-modifiable, this means that the return address capability is also non-modifiable, hence providing enhanced security by ensuring that the return address capability cannot be adjusted prior to it being used as a return address.

Once the return address capability has been produced, then the contents of the capability register $C_N$ 520 are copied into the PCC register 80 to form the new program counter capability 525. In due course, a return instruction can be executed to return from the branch, at which point the PCC will be updated with the contents of the CLR. Since the CLR capability was non-modifiable, this will ensure that that return address capability is not tampered with in the intervening period.

FIG. 13 is a diagram schematically illustrating how the establishment of an unmodifiable capability within a general purpose capability register can then be used to provide a process with a capability that it can only use as an entry point capability when executing a branch instruction. In particular, the capability 550 is assumed to have its X bit set, all of its W bits clear, and at least one R bit set, as indicated by the box 565. As will be apparent from the earlier described FIG. 9, this essentially means that the capability is non-modifiable, is executable (which is only relevant when the capability is placed within the PCC register 80), and is only readable when in the PCC register 80. Hence, within the general purpose capability register $C_N$, this capability 550 is not readable or writeable, and is unmodifiable. Hence it can only be used by the process that has been given that capability, as a capability that can be loaded into PCC via a branch instruction.

When a branch instruction is subsequently executed in order to load the contents of the capability register $C_N$ into the PCC register 80, this results in the updated program counter capability 560, whose collection of X, W and R bits 570 corresponds to those within the fields 565 of the source capability 550. Although none of the X, W and R permission bits has changed, because the capability is now a program counter capability, that capability is executable, hence allowing instructions to be fetched, but is also readable for any read operations of the type for which the corresponding R bit is set.

This means that "literals" can now be read from memory using the PCC 560. For example, a load instruction may be used specifying as a source address an address derived from the PCC, with the result being stored within one of the integer registers Xn. When deriving the address from the PCC 560, if the address is within the allowable range, and the type of read operation in question has the associated R permission bit set, then the load operation can be performed in order to load literal data from the derived address, and store that data within the register Xn.

In one embodiment, the processing circuitry may be arranged to always use the alternative interpretation. However, other instances of the processing circuitry may also be able to use the same capabilities, but interpret them in accordance with the default interpretation, since the mechanism described herein does not involve any change in the permission bits used, and hence provides backwards compatibility with existing systems that use the default interpretation.

In another embodiment, the processing circuitry may be able to selectively switch from using the default interpretation to the alternative interpretation, and vice versa, and as shown in FIG. 1 a configuration bit 90 may be provided as part of the control information for the processing circuitry, with the value of the configuration bit determining whether the processing circuitry is using the default interpretation or the alternative interpretation. The setting of that configuration bit may be limited to particular types of code executing on the processing circuitry. For example, secure code, or an operating system or hypervisor, may be arranged to change the configuration bit under certain situations.

FIG. 14 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 630 running a host operating system 620 supporting a virtual machine program 610. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 610 may be stored on a computer-readable storage medium (which may be a non-transitory medium), and provides an application program interface (instruction execution environment) to an application program 600 which is the same as the application program interface which would be provided by the real hardware which is the device being modelled by the virtual machine program 610. The above described techniques for interpreting permissions of a capability may be implemented within a virtual machine environment. For example, software running in, or controlling, a virtual machine, could make use of hardware implementing such a feature.

The above described embodiments provide a mechanism for encoding one or more additional permissions into a capability without consuming extra permission bits. Logical combinations of the existing permission bits may be used to enable an enlarged set of permissions to be encoded. In one embodiment, this involves re-using redundant encodings to avoid wasting a scarce permission bit to encode one or more additional permissions, but whilst still retaining desirable behaviour. Further, a monotonically decreasing permission model is maintained. In particular, irrespective of whether the default interpretation or the alternative interpretation is used, the individual permission bits can only be changed from the set value to the clear value when the capability is identified as being modifiable, and hence a process that is constrained by a capability is not able to restore to the set state any permission bits that have been cleared within that capability.

In one particular embodiment, an additional permission that is added is a modifiable permission, thereby enabling the modifiability of capabilities to be expressed on a capability-by-capability basis. This can provide enhanced flexibility and security within capability-based systems. Optionally, the modifiable permission may alter the behaviour of certain instructions used to generate capabilities from the capability held in the PCC register, including but not limited to carrying the modifiable permission into capabilities generated by branch and link instructions, for example to produce non-modifiable return addresses, and/or removing the executable permission from capabilities generated by PC relative address calculation (ADR) instructions.

Further, certain useful behaviours can be accommodated by selectively clearing permission bits. For example, clearing all write permission bits from a capability that has its X permission bit set changes that capability from modifiable and non-executable to non-modifiable and executable. As another example, clearing the execute permission bit from a capability that has at least one readable permission bit set, for example through the use of an ADR instruction, changes the capability from non-modifiable, non-readable to modifiable and readable.

Further, in embodiments where the optional configuration bit 90 is used, the effects of the modifiable permission can be disabled, by causing the processing circuitry to revert to the default interpretation where each of the individual permission bits has an associated permission, and there are no combinations of those permission bits that prevent a capability from being modified. When using such a default interpretation, any restrictions on modifying a capability will typically be expressed on a more global scale, for example with reference to some general control information.

By using the alternative interpretation, where logical combinations of the permission bits are used to define the state of an enlarged set of permissions, this allows stronger (more constrained) permissions to be specified in association with individual capabilities, without requiring a proliferation in the number of permission bits used.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions in order to perform operations; and
a capability storage element accessible to the processing circuitry and arranged to store a capability used to constrain at least one operation performed by the processing circuitry when executing said instructions, said capability identifying a plurality N of default permissions whose state, in accordance with a default interpretation, is determined from N permission flags provided in said capability, in accordance with the default interpretation each permission flag being associated with one of the default permissions;
the processing circuitry being arranged to analyse the capability in accordance with an alternative interpretation, in order to derive, from logical combinations of the N permission flags, state for an enlarged set of permissions, the enlarged set comprising at least N+1 permissions,
wherein said enlarged set of permissions comprises said plurality N of default permissions and at least one additional permission.

2. An apparatus as claimed in claim 1, wherein when a permission has a set state the processing circuitry is granted that permission for the capability subject to any overriding control information, and when a permission has a clear state the processing circuitry has that permission revoked for the capability.

3. An apparatus as claimed in claim 1, wherein said enlarged set of permissions includes a modifiable permission that, when in a clear state, identifies that the capability is unmodifiable by one or more capability modifying instructions.

4. An apparatus as claimed in claim 3, wherein said modifiable permission, when in a set state, allows the N permission flags provided in the capability to be transitioned from a set value to a clear value, subject to any overriding control information preventing modification.

5. An apparatus as claimed in claim 1, wherein said plurality N of default permissions comprise:
one or more memory access permissions to identify, when in a clear state, that the capability is prevented from being used by one or more memory access operations to access data in memory; and
an executable permission to identify, when in a clear state, that the capability, when forming a program counter capability, is prevented from being used to fetch instructions from the memory.

6. An apparatus as claimed in claim 5, wherein said one or more memory access permissions comprise at least one write permission to identify whether the capability is prevented from being used to perform at least one type of write operation to the memory, and at least one read permission to identify whether the capability is prevented from being used to perform at least one type of read operation from the memory.

7. An apparatus as claimed in claim 1, wherein:
said enlarged set of permissions includes a modifiable permission that, when in a clear state, identifies that the capability is unmodifiable by one or more capability modifying instructions;
said plurality of default permissions comprise an executable permission to identify when in a clear state, that the capability, when used as a program counter capability, is prevented from being used to fetch instructions from the memory; and
in accordance with said alternative interpretation of the N permission flags, the capability is prevented from having both the executable permission and the modifiable permission in a set state.

8. An apparatus as claimed in claim 7, wherein:
said plurality of default permissions further comprise at least one write permission to identify whether the capability is prevented from being used to perform at least one type of write operation to the memory, and at least one read permission to identify whether the capability is prevented from being used to perform at least one type of read operation from the memory;

said N permission flags comprise at least one write bit, at least one read bit and an execute bit whose values, in accordance with the default interpretation, identify the state of the at least one write permission, the at least one read permission and the execute permission, respectively; and
in accordance with the alternative interpretation the processing circuitry is arranged to determine that the modifiable permission is in the set state when at least one write bit is set or the execute bit is clear.

9. An apparatus as claimed in claim 8, wherein:
in accordance with the alternative interpretation the processing circuitry is arranged to determine that the executable permission is in the set state when both the execute bit is set and all of the at least one write bits are clear.

10. An apparatus as claimed in claim 8, wherein:
for each read permission, in accordance with the alternative interpretation the processing circuitry is arranged to determine that that read permission is in the set state when the associated read bit is set, and either the modifiable permission is in the set state or the capability is being used as a program counter capability.

11. An apparatus as claimed in claim 8, wherein:
the processing circuitry is arranged, in response to executing an address generation instruction to generate a result capability from a program counter capability, to clear the execute bit within the result capability.

12. An apparatus as claimed in claim 11, wherein when the program counter capability has the execute bit set and all of the at least one write bits clear, the clearing of the execute bit in the result capability causes the result capability to be considered, in accordance with the alternative interpretation, to have both its modifiable permission in the set state and each read permission in the state indicated by the associated read bit.

13. An apparatus as claimed in claim 8, wherein:
the processing circuitry is responsive to executing a branch with link instruction to generates a return address capability from a program counter capability such that, when the modifiable permission is in the clear state within the program counter capability, the return address capability also has its modifiable permission in the clear state.

14. An apparatus as claimed in claim 8, further comprising:
at least one additional capability storage element which, in combination with said capability storage element, form one or more general purpose capability storage elements and a program counter capability storage element;
when the capability stored in one of said one or more general purpose capability storage elements has the execute bit set, at least one of the read bits set and all of the at least one write bits clear, the processing circuitry is constrained, in accordance with the alternative interpretation, to solely use said capability to form a new program counter capability to be stored in the program counter capability storage element; and
once said capability is stored in the program counter capability storage element, the new program counter capability is considered, in accordance with the alternative interpretation, to have in the set state each read permission whose associated read bit is set, thereby enabling literal values to be read from memory by the processing circuitry.

15. An apparatus as claimed in claim 1, further comprising:
a configuration storage element to store a configuration value indicative of which of the default interpretation and the alternative interpretation is to be applied by the processing circuitry.

16. An apparatus as claimed in claim 1, wherein the capability is a bounded pointer, and the permissions are used to control usage by the processing circuitry of a pointer value specified within the capability.

17. A non-transitory, computer-readable storage medium storing a virtual machine computer program comprising program instructions to control a host data processing apparatus to provide an instruction execution environment corresponding to the apparatus according to claim 1.

18. A method of interpreting permissions associated with a capability in an apparatus comprising processing circuitry to execute instructions in order to perform operations, and a capability storage element accessible to the processing circuitry and arranged to store the capability for use in constraining at least one operation performed by the processing circuitry when executing said instructions, the capability identifying a plurality N of default permissions, and the method comprising:
providing N permission flags within said capability, such that in accordance with a default interpretation a state of the default permissions is determined from said N permission flags and each permission flag is associated with one of the default permissions; and
analysing the capability in accordance with an alternative interpretation, in order to derive, from logical combinations of the N permission flags, state for an enlarged set of permissions, the enlarged set comprising at least N+1 permissions,
wherein said enlarged set of permissions comprises said plurality N of default permissions and at least one additional permission.

19. An apparatus comprising:
processing means for executing instructions in order to perform operations; and
capability means for access by the processing means and for storing a capability used to constrain at least one operation performed by the processing means when executing said instructions, said capability identifying a plurality N of default permissions whose state, in accordance with a default interpretation, is determined from N permission flags provided in said capability, in accordance with the default interpretation each permission flag being associated with one of the default permissions;
the processing means for analysing the capability in accordance with an alternative interpretation, in order to derive, from logical combinations of the N permission flags, state for an enlarged set of permissions, the enlarged set comprising at least N+1 permissions,
wherein said enlarged set of permissions comprises said plurality N of default permissions and at least one additional permission.

* * * * *